(12) United States Patent
Rebo et al.

(10) Patent No.: US 8,074,070 B2
(45) Date of Patent: Dec. 6, 2011

(54) METHOD FOR FAST, SECURE 802.11 RE-ASSOCIATION WITHOUT ADDITIONAL AUTHENTICATION, ACCOUNTING, AND AUTHORIZATION INFRASTRUCTURE

(75) Inventors: Richard D. Rebo, Fairlawn, OH (US); Victor J. Griswold, North Canton, OH (US)

(73) Assignee: Cisco Technology, Inc., San Jose, CA (US)

( * ) Notice: Subject to any disclaimer, the term of this patent is extended or adjusted under 35 U.S.C. 154(b) by 804 days.

(21) Appl. No.: 12/021,585

(22) Filed: Jan. 29, 2008

(65) Prior Publication Data

US 2008/0119184 A1   May 22, 2008

Related U.S. Application Data

(63) Continuation of application No. 10/346,988, filed on Jan. 17, 2003, now Pat. No. 7,346,772.

(60) Provisional application No. 60/426,756, filed on Nov. 15, 2002.

(51) Int. Cl.
*H04L 9/32* (2006.01)
*H04L 29/06* (2006.01)

(52) U.S. Cl. ........................................ 713/168; 713/155

(58) Field of Classification Search .................. 713/168, 713/155
See application file for complete search history.

(56) References Cited

U.S. PATENT DOCUMENTS

| | | | |
|---|---|---|---|
| 6,772,331 B1 * | 8/2004 | Hind et al. | 713/151 |
| 6,879,600 B1 * | 4/2005 | Jones et al. | 370/466 |
| 6,971,005 B1 * | 11/2005 | Henry et al. | 713/155 |
| 7,028,186 B1 * | 4/2006 | Stenman et al. | 713/173 |
| 7,069,433 B1 * | 6/2006 | Henry et al. | 713/151 |
| 7,356,001 B1 * | 4/2008 | Jones et al. | 370/331 |
| 7,373,508 B1 * | 5/2008 | Meier et al. | 713/168 |
| 7,499,466 B2 * | 3/2009 | Hundscheidt et al. | 370/432 |
| 7,539,309 B2 * | 5/2009 | Stadelmann et al. | 380/270 |
| 2002/0018569 A1 * | 2/2002 | Panjwani et al. | 380/247 |
| 2002/0089958 A1 * | 7/2002 | Feder et al. | 370/338 |
| 2002/0151300 A1 * | 10/2002 | Suda et al. | 455/422 |
| 2002/0174335 A1 * | 11/2002 | Zhang et al. | 713/168 |
| 2002/0191572 A1 * | 12/2002 | Weinstein et al. | 370/338 |
| 2003/0051140 A1 * | 3/2003 | Buddhikot et al. | 713/169 |
| 2003/0084287 A1 * | 5/2003 | Wang et al. | 713/168 |
| 2004/0019786 A1 * | 1/2004 | Zorn et al. | 713/168 |
| 2004/0198220 A1 * | 10/2004 | Whelan et al. | 455/41.1 |

* cited by examiner

*Primary Examiner* — Techane Gergiso
(74) *Attorney, Agent, or Firm* — Tucker Ellis & West LLP

(57) ABSTRACT

A method wherein an access point authenticates itself with neighboring access points and establishes secure and mutually authenticated communication channels with its neighboring access points. When an access point learns of a neighboring access point, it initiates an authentication with an authentication server through the neighboring access point. Once access points have mutually authenticated each other, whenever a station authenticates itself with a first access point, the first access point communicates the station's authentication context information, for example session key and session identifier, to each neighboring access point. Thus, when the station roams to a neighboring access point, the neighboring access point presents the station with a reauthentication protocol, for example LEAP reauthentication, and if the reauthentication is successful, communication between the station and the neighboring access point takes place immediately and no new EAP authentication needs to occur.

12 Claims, 3 Drawing Sheets

METHOD FOR FAST, SECURE 802.11 RE-ASSOCIATION WITHOUT ADDITIONAL AUTHENTICATION, ACCOUNTING, AND AUTHORIZATION INFRASTRUCTURE

CROSS-REFERENCE TO RELATED APPLICATIONS

This application is a continuation of U.S. application Ser. No. 10/346,988 filed on Jan. 17, 2003 now U.S. Pat. No. 7,346,772, which claims the benefit of U.S. Provisional Application No. 60/426,756, filed Nov. 15, 2002.

BACKGROUND OF THE INVENTION

The present invention relates generally to authentication protocols for roaming clients, and more specifically to a protocol for use by 802.11 wireless stations to quickly associate with a new access point while roaming.

Most current 802.11 network-level authentication protocols require a substantial amount of real time to re-establish a wireless station's connectivity to the network after that station roams from one access point (AP) to another access point. Typically, when a station associates with a first access point, it has to be authenticated through a central authentication server. When the station roams to a new access point, the station must again authenticate itself with the authentication server which does a full challenge request and response. A new accounting session is then established. This method relies on the initial authentication as a means for key rotation and generates a new accounting session for each roam, causing an unnecessary session teardown and restart.

This delay in re-establishing connectivity greatly impacts 802.11 Quality of service (QoS) to the point that some upper-level protocols, such as Voice-over-IP (VoIP), actually fail. Furthermore, each roam commonly necessitates interaction with a site's Authentication, Accounting, and Authorization (AAA) servers, resulting in a significant increase in server load, to the point at which some servers fail to provide the necessary rate of authentications requests for the 802.11 stations.

Other attempts to resolve this issue have utilized a variety of approaches. One approach is to use AP to AP communications to forward station AAA data, but these fail to use strong authentication between the APs. Another approach is to use "proxy" AAA servers closer in the network to the APs and stations, but these approaches generally require the addition of new network infrastructure devices at each network subnet. For some sites, this is an unacceptable cost, and other sites may not be able to incur the additional management burden.

Thus, the need exists for a secure method for authenticating a station when the station roams from one access point to another that decreases traffic to the authentication server.

BRIEF SUMMARY OF THE INVENTION

In view of the aforementioned needs, the invention contemplates a pre-authentication method wherein an access point authenticates itself with neighboring access points and establishes secure and mutually authenticated communication channels with its neighboring access points. When an access point learns of a neighboring access point, it initiates an authentication with an authentication server through the neighboring access point. In a preferred embodiment, the first access point initiates a Lightweight Extensible Authentication Protocol (LEAP) authentication with the second access point via an Authentication, Accounting, and Authorization (AAA) server.

Once access points have mutually authenticated each other, whenever a station authenticates itself with a first access point, the first access point communicates the station's authentication context information, for example session key and session identifier, to each neighboring access point. Thus, when the station roams to a neighboring access point, the neighboring access point presents the station with a reauthentication protocol, for example LEAP reauthentication, and if the reauthentication is successful, communication between the station and the neighboring access point takes place immediately.

One advantage of the present invention is that it requires no new devices or services to be added to the site's network. Another advantage of the present invention is that access points are mutually authenticated via a mechanism which is cryptographically as secure as the mechanism used for any client station on the network. The present invention does not require access points to be considered "more trusted than clients," which is a common security hole in most prior art implementations. Yet another advantage of the present invention is that it requires very little new protocol support implemented on the client stations. Still another advantage of the present invention is that the protocol leverages use of network history to optimize future network operations. Still yet another advantage of the present invention is that the protocol significantly diminishes the load on a site's AAA infrastructure.

Still other objects of the present invention will become readily apparent to those skilled in this art from the following description wherein there is shown and described a preferred embodiment of this invention, simply by way of illustration of one of the modes best suited for to carry out the invention. As it will be realized, the invention is capable of other different embodiments, and its several details are capable of modifications in various obvious aspects, all without departing from the scope of the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

Figure 1:
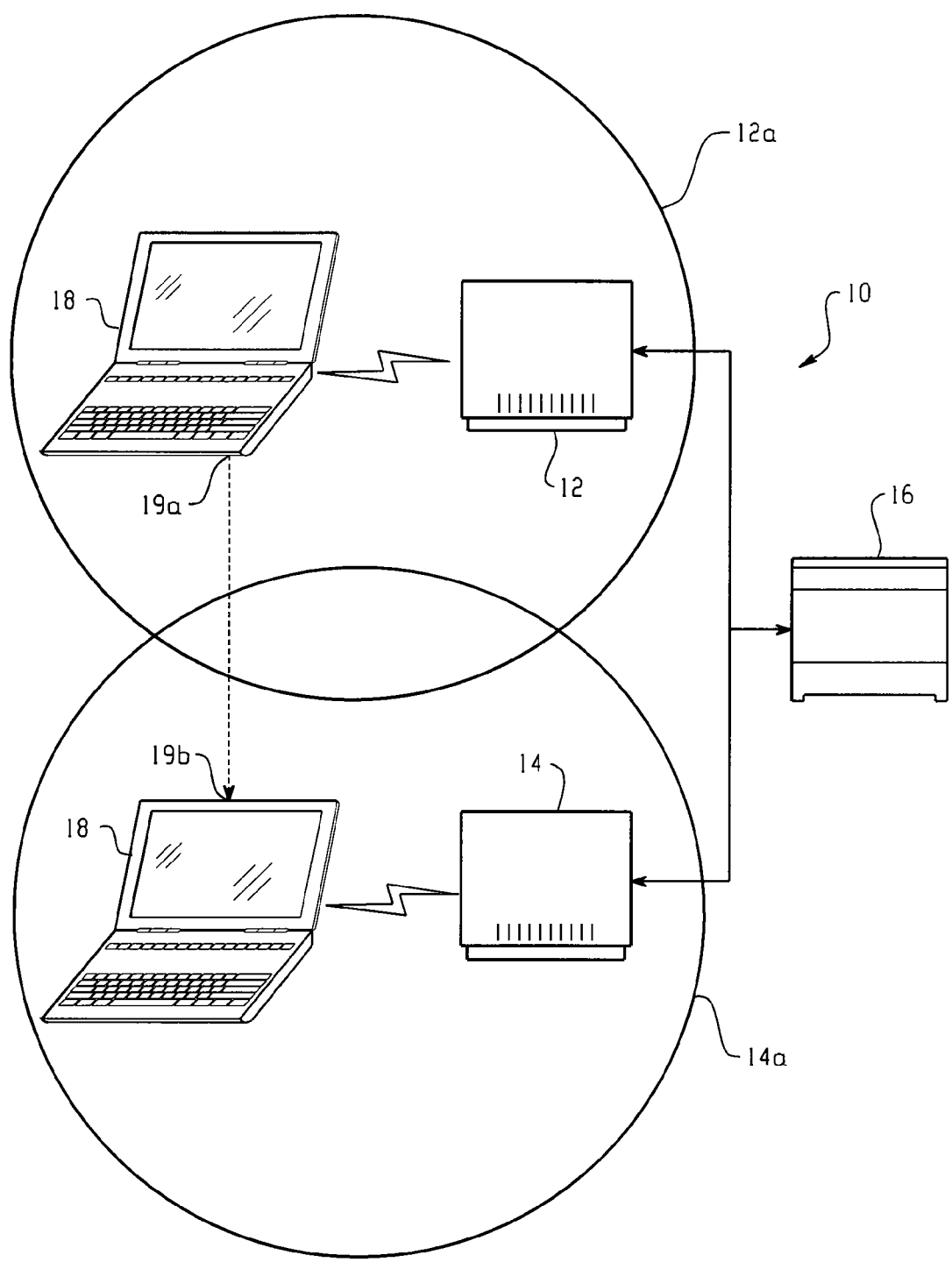
FIG. 1 is a block diagram of an 802.11 network with two access points.

Referring first to FIG. 1, there is shown a typical Extended Service Set (ESS) 10. The ESS 10 comprises two access points (AP) 12, 14, each access point 12, 14 having a basic service set (BSS), 12a and 14a respectively, associated with it. When a client or station (STA) 18, typically a wireless station or WSTA, is within a BSS, it communicates with the AP associated with that BSS. Typically the BSSs 12a and 14a have an overlap region and the STA 18 communicates with the AP 12 or 14 it receives the strongest signal from. As shown in FIG. 1, the STA 18 communicates via wireless communications to the APs 12 and 14. The APs 12 and 14 are connected via a secure, typically wired connection to an Authentication, Accounting, and Authorization (AAA) server 16. In the preferred embodiment, the AAA server 16 is a Remote Authentication Dial-In User Server (RADIUS server); however, other types of server's with authentication capabilities are acceptable.

As shown in FIG. 1, the client, or station, (STA) 18 will associate with an AP 12 while at a first position 19a. When the STA 18 first associates with an AP in the network, it must first authenticate itself. If the STA 18 starts at the first position 19a as shown in FIG. 1, then AP 12 will authenticate the STA via a communication with the AAA server 16.

When the STA 18 moves from the first position 19a to a second position 19b, it then has to associate with AP 14. In the prior art, this entailed AP 14 communicating with the AAA server 16 to authenticate the STA 18.

However, the present invention utilizes a reauthentication protocol designed to reduce the volume of communication between the APs 12 and 14 and the AAA server 16. Initial, client (or station), extensible authentication protocol (EAP) authentication with the site's AAA server 16 proceeds as is done currently. When the client roams from a first access point to a second access point, if the second access point does not already have knowledge of the client's current AAA session, the client must perform a EAP authentication again, as is done in the prior art, and the second access point will issue a multicast Deregistration Notice to its subnet, as is done in the prior art. Note that even when AP 14 already knows of STA 18's AAA context, it must still issue the multicast Deregistration Notice to update the Ethernet network's switch forwarding tables. It is just via this mechanism that AP 12 learns that a STA roamed from it to AP 14.

Upon observing the Deregistration Notice from the second access point, unlike the prior art, the first access point will add the second access point to its Roaming Neighborhood table and will authenticate itself with the second access point by initiating an EAP, or preferably a Lightweight Extensible Authentication Protocol (LEAP), authentication with the AAA server through the second access point. Upon success of the EAP or LEAP authentication of the first access point via the second access point to the AAA server, the first access point and the second access point have established a secure and mutually authenticated communications channel. For all subsequent EAP or LEAP clients associated to the first access point, the first access point will securely forward the subsequent client's authentication context information, session key and session identifier, to each access point in its Roaming Neighborhood with which it is actively authenticated. Then, upon any subsequent roam from the first access point to the second access point, the client will then be presented with a LEAP Reauthentication protocol upon its association with the second access point. If the LEAP reauthentication is successful, then communication can take place immediately and no new EAP authentication needs to occur.

After the access points have established a secure and mutually authenticated communications channel, then similar to what occurs when a new client associates with the first access point, when a client associates with the second access point, the second access point will securely forward the client's authentication context information, session key, and session identifier, to each access point in its Roaming Neighborhood with which it is actively authenticated. The access points only forward the client data when the client actually associate with them. Thus, when the second access point receives the client data from the first access point, it will not forward the data to the access points in its roaming table until the client actually roams and associates with the second access point. When the client roams from the second access point to the first access point, the client is presented with a LEAP Reauthentication protocol upon its association with the first access point.

For embodiments using RADIUS accounting, a couple of options exist. For the simplest implementation, the first access point can close the client's current accounting session upon receiving the Deregistration Notice. The second access point can then initiate a new accounting session for the client, this may be concurrent with requesting an "early renew" reauthentication for the client, which would not induce a loss in connectivity. A more sophisticated implementation would involve a Mobility Context Transfer from the first access point to the second access point of the client's current accounting records.

Figure 2:
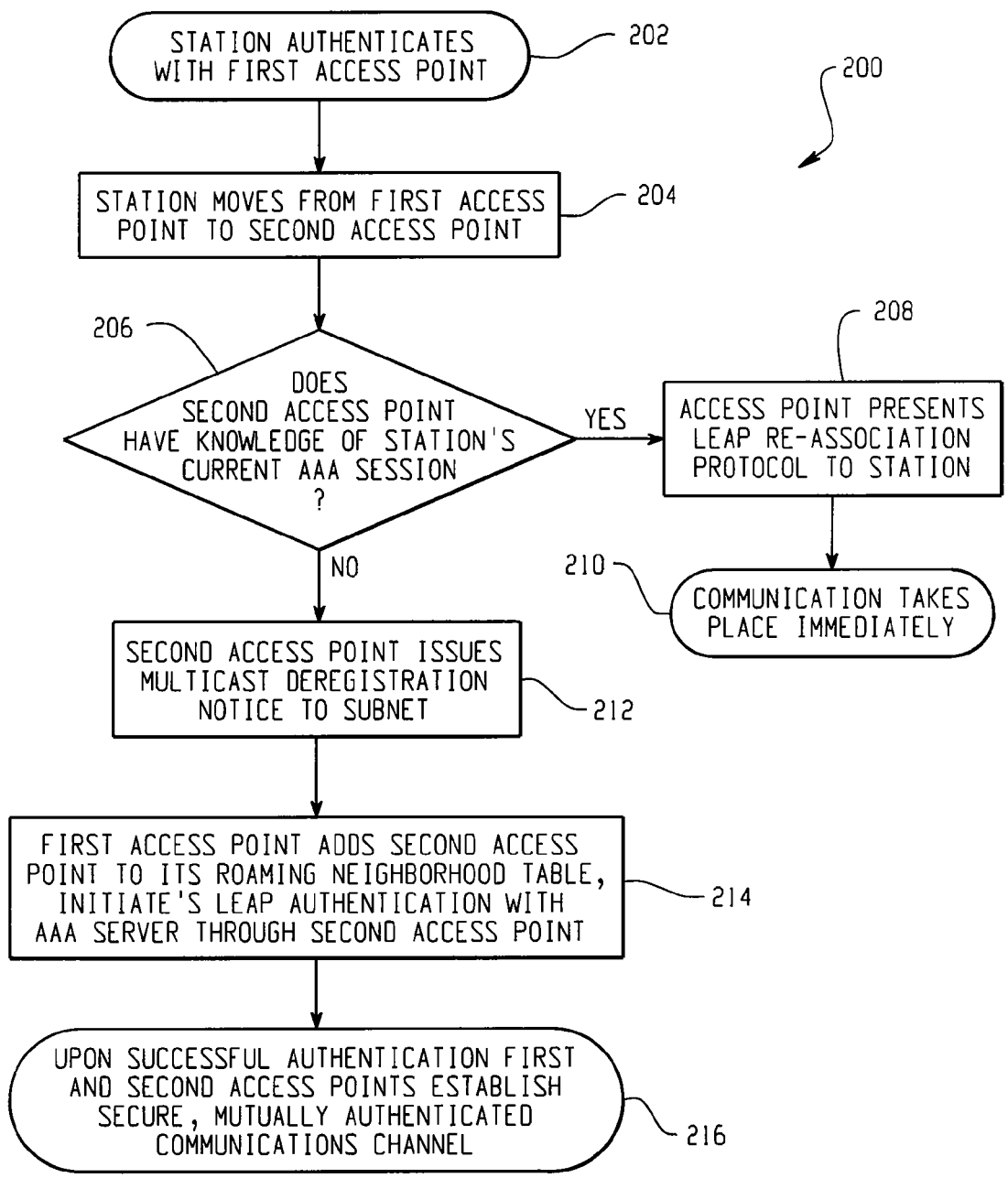
FIG. 2 is a block diagram showing the steps when a station roams from a first access point to a second access point.

Referring now to FIG. 2, there is shown a process 200 contemplated by the present invention. The process 200 begins at step 202 wherein a station, STA 18, authenticates itself with a first access point, AP 12. The authentication could be by conventional EAP or other authentication protocols such as LEAP. At step 204, the station moves from a first position 19a within the BSS 12a serviced by first access point 12 to a second position 19b within BSS 14a serviced by second access point 14. At step 206 the second access point 14 checks to determine whether it has knowledge of the station's 18 current AAA session. If the second access point 14 is aware of the station's 18 AAA session, then at 208 the second access point 14 presents an EAP, LEAP or other reassociation protocol to the station 18, and then as shown at step 210 communication between the second access point 14 and the station 18 takes place immediately.

If however, at step 206 the second access point 14 is unaware of station 18's current AAA session, then as shown at step 212 the station authenticates with the 2nd Access Point. As shown in step 214, the second access point 14 then issues a multicast Deregistration Notice to its subnet. Then as shown in step 216, the first access point 12, upon receiving the Deregistration Notice sent by the second access point 14, adds the second access point 14 to its Roaming Neighborhood table and initiates a LEAP authentication with the AAA server through the second access point 14. As shown in step 216, upon successful authentication of the first access point 12 with the second access point 14, the first access point 12 and second access point 14 establish a secure, mutually authenticated communications channel with each other.

Figure 3:
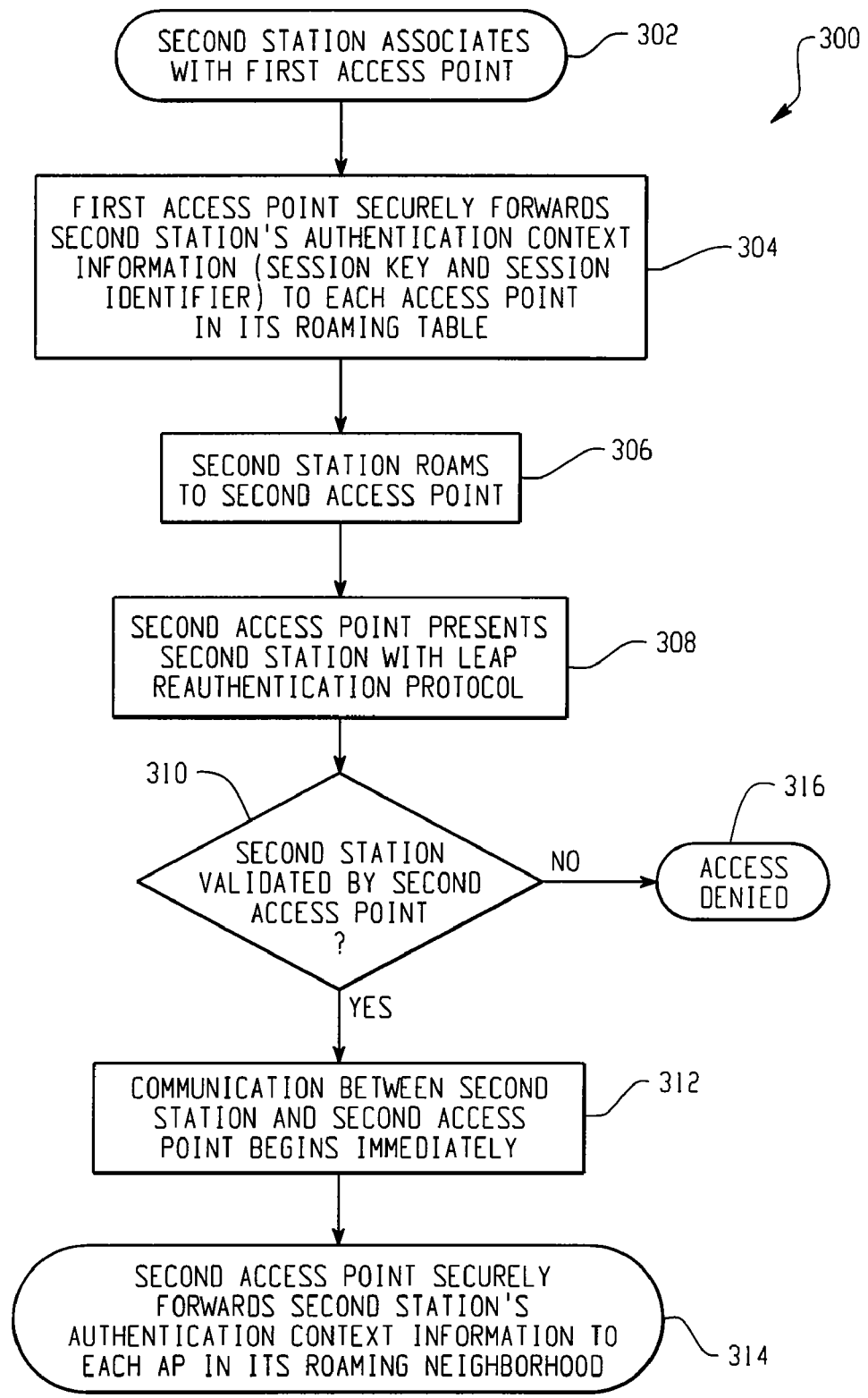
FIG. 3 is a block diagram illustrating the steps when a station roams from a first access point to a second access point after the first and second access points have established a secure and mutually authenticated communications channel between the first access point and the second access point.

Referring now to FIG. 3, there is shown a process 300 that occurs when a second station associates with the first access point after the first access point 12 and second access point 14 have already established a secure, mutually authenticated communication channel. The process 300 begins at step 302 when the second station (not shown) associates with the first access point 12. The second station would authenticate using EAP, LEAP, or other authentication protocol. After the second station is authenticated by the first access point 12, the first access point 12 securely forwards the second station's authentication context information, session key and session identifier, to each access point in its roaming table, including second access point 14, as shown in step 304. At step 306 the second station roams to the second access point 14. Because at step 304 the second access point 14 received the second station's authentication context information, at step 308 the second access point 14 presents the second station with a LEAP Reauthentication protocol. If at step 310 the second station is validated, then as shown in step 312 communication between the second station and the second access point 312 begins immediately. As shown in step 314, the second access point 14 then securely forwards the second station's context information to each access point in its Roaming Neighborhood.

If at step 310 the second station is not validated by the second access point, then as shown at step 316 the station must attempt authentication as an initial authentication.

With the present invention, security of passing client credentials between access points is provided by mutual LEAP authentication of the access points. There is no obvious security hole of passing client session data in the clear over the wired network as is possible under pre-authentication protocols. The access points have no shared secrets in common between them. The only shared secret is individual shared secrets between each access point and the AAA server, not network wide. The compromise of one access point does not provide a shared secret network-wide access.

LEAP latency in mutual authentication between access points is avoided by pre-authenticating access points within each other's roaming neighborhood. The roaming neighborhood is based on actual client roaming patterns, and should generally comprise only two to four other access points. Specification of the Roaming Neighborhood can be either transient, wherein the Roaming Neighborhood is regenerated each time an access point restarts, or could be persistent.

For the pre-authentication to function properly with RADIUS servers, the RADIUS server must be configured to allow "multiple simultaneous logons" of access point devices.

Though operation of this mechanism is restricted to roaming with the same administrative subnet of each pair of access points, it is not a restriction on client roaming if Virtual Local Area Networks (VLANs) are enabled. In other words, if access points are on a separate VLAN from clients, the present invention supports client inter-subnet mobility.

Although the invention has been shown and described with respect to a certain preferred embodiment, it is obvious that equivalent alterations and modifications will occur to others skilled in the art upon the reading and understanding of this specification. The present invention includes all such equivalent alterations and modifications.

The invention claimed is:

1. An apparatus, comprising:
an access point configured to wirelessly communicate with mobile clients and configured to communicate with a plurality of other access points over a network;
wherein a first mobile client roams from a second access point;
wherein the access point determines whether the second access point has sent authentication context information for the first mobile client;
wherein the access point authenticates the first mobile client with an authentication server using an authentication protocol;
wherein the access point is configured to send a multicast deregistration notice for the first mobile client onto the network responsive to successfully authenticating the first mobile client;
wherein the access point is configured to mutually authenticate with the second access point that is in communication with the access point via the network in response to the first mobile client roaming from the second access point;
wherein the access point establishes a secure communication channel with the second access point via the network upon successfully authenticating with the second access point;
wherein the access point is configured to receive authentication context information for a second mobile client from the second access point via the secure communication channel, the authentication context information comprises a session key and a session identifier;
wherein the second mobile client roams from the second access point to the access point after the access point receives the context information for the second mobile client via the secure communication channel; and
wherein the access point is responsive to receiving an association request from the second mobile client to authenticate the second mobile client using a re-authentication protocol with the authentication context information received from the second access point.

2. The apparatus according to claim 1, further comprising a roaming table;
wherein the access point is responsive to receiving a communication indicating a mobile client associated with the access point has roamed to a third access point to send an association request to the third access point via the network; and
wherein the access point adds the third access point to the roaming neighborhood table; and
wherein the access point is further configured to mutually authenticate with the third access point responsive to receiving a response to the association request from the third access point.

3. The apparatus according to claim 2, wherein the access point is further configured to establish a secure communication channel with the third access point responsive to successfully mutually authenticating with the third access point.

4. The apparatus according to claim 3, wherein the access point is configured to receive authentication context information from the second access point for a new mobile client on the secure communication channel between the access point and the second access point;
wherein the access point is configured to perform a re-authentication protocol with the new mobile client using the authentication context information received from the second access point; and
wherein the access point is configured to forward the authentication context information for the new mobile client to the third access point responsive to the new mobile client roaming from the second access point to the access point.

5. The apparatus according to claim 2, wherein the access point adds the third access point to the roaming neighborhood table responsive to mutually authenticating with the third access point.

6. A method for an access point configured to provide access for wireless clients to a network, comprising:
associating with a first wireless client that is roaming from a second access point, the associating comprises authenticating the first wireless client with an authentication server using an authentication protocol;
sending a multicast deregistration notice for the first wireless client onto the network responsive to successfully authenticating the first wireless client;

determining whether a secure communication channel has been established with the second access point over a network;

mutually authenticating with a second access point on the network in response to the first wireless client roaming from the second access point and determining that there is no secure communication channel established with the second access point;

establishing a secure communication channel with the second access point on the network upon authenticating the second access point;

receiving authentication context information for a second wireless client associated with the second access point from the second access point via the network after the secure communication channel is established, wherein the authentication context information comprises a session key and a session identifier;

receiving an association request from the second wireless client after receiving the authentication context information in response to the second wireless client roaming from the second access point; and authenticating the second wireless client by performing a re-authentication protocol with the wireless client using the authentication context information received from the second access point responsive to the association request.

7. The method of claim 6, further comprising:

receiving a communication indicating that one of a group consisting of the first wireless client, the second wireless client, and a third wireless client has roamed to a third access point;

sending an association request to the third access point via a network coupling the access point to the third access point responsive to receiving the communication indicating that one of a group consisting of the first wireless client, the second wireless client, and the third wireless client has roamed to a third access point;

mutually authenticating with the third access point; and establishing a secure communication channel with the third access point responsive to mutually authenticating with the third access point.

8. The method of claim 7, further comprising adding the third access point to a roaming neighborhood table responsive to mutually authenticating with the third access point.

9. The method of claim 7, further comprising: associating a fourth wireless client after mutually authenticating with the third access point; and sending authentication context information for the fourth wireless client to the third access point responsive to associating the fourth wireless client.

10. The method of claim 7, further comprising:

receiving authentication context information for a fourth wireless client via the network after mutually authenticating with the third access point;

receiving an association request from the fourth wireless client after receiving the authentication context information;

authenticating the fourth wireless client by performing a re-authentication protocol with the wireless client using the authentication context information responsive to the association request; and forwarding authentication context information to the third access point via the secure communication channel established with the third access point responsive to authenticating the fourth wireless client.

11. The method of claim 6, further comprising receiving current accounting records for the wireless client from the second access point via the secure communication channel.

12. An access point, comprising:

means for wireless communicating with a plurality of wireless stations;

means for communicating with a second access point over a network;

means for communicating with a third access point over the network;

means for receiving an association request from a first wireless station roaming from the second access point;

means for determining whether authentication context information was received from the second access point, wherein the authentication context information comprises a session key and a session identifier;

means for authenticating the first wireless station with an authentication server using an authentication protocol responsive to determining no authentication context information was received prior to the authentication request for the first wireless station;

means for sending a multicast deregistration message responsive to associating the first wireless station roaming from the second access point;

means for receiving a request to mutually authenticate with the second access point;

means for mutually authenticating with the second access point responsive to the means for receiving a request to mutually authenticate with the second access point;

means for establishing a secure communication channel with the second access point responsive to mutually authenticating with the second access point;

means for receiving authentication context information for a second wireless station associated with the second access point from the second access point via the secure communication channel;

means for receiving a request from the second wireless station to roam from the second access point;

means for authenticating the wireless station using the authentication context information received from the second access point responsive to receiving the request to roam by the second wireless station from the second access point;

means for determining a currently associated wireless station is roaming to the third access point;

means for determining whether a secure communication channel has been established with the third access point;

means for mutually authenticating with the third access point after the currently associated wireless station roams to the third access point and determining a secure communication channel with the third access point does not already exist;

means for establishing a mutually secure communication channel with the third access point responsive to the means for mutually authenticating successfully authenticating with the third access point; and means for automatically forwarding authentication context information for associated wireless stations to the third access point via the mutually secure communication channel with the third access point after the mutually secure communication channel with the third access point has been established.

* * * * *